United States Patent [19]

Haller

[11] Patent Number: 5,296,845
[45] Date of Patent: Mar. 22, 1994

[54] COMPUTER KEYBOARD FOR USE WITH SOFTWARE FOR PLAYING GAMES OR SOLVING PUZZLES

[76] Inventor: Amit Haller, 20 Taviv Street, Petah Tiqua, Israel

[21] Appl. No.: 974,346

[22] Filed: Nov. 10, 1992

Related U.S. Application Data

[63] Continuation of Ser. No. 697,698, May 9, 1991, abandoned.

[51] Int. Cl.⁵ .............................................. G09G 3/02
[52] U.S. Cl. .................... 345/168; 273/434; 273/157 R; 434/335; 434/406; 345/121
[58] Field of Search ............ 273/85 CP, 433, 434, 273/153 S, 153 R, 157 R, 153 J, 237, 238, DIG. 28; 434/333, 335, 348, 323, 402, 403, 404, 406; 340/724, 711, 706

[56] References Cited

U.S. PATENT DOCUMENTS

| | | |
|---|---|---|
| 4,173,832 | 11/1979 | Chen et al. ............................ 434/335 |
| 4,863,172 | 9/1989 | Rosenwinkel et al. ........... 273/153 S |
| 4,978,129 | 12/1990 | Komeda et al. .................... 273/85 G |
| 4,978,302 | 12/1990 | Clossey ................................ 434/335 |
| 5,088,928 | 2/1992 | Chan .................................... 273/237 |

*Primary Examiner*—Tommy Chin
*Assistant Examiner*—A. Au
*Attorney, Agent, or Firm*—Edwin D. Schindler

[57] ABSTRACT

A computer system having a computer keyboard for use with software for playing games or solving puzzles is disclosed, which includes software for playing a puzzle game, a central processing unit for processing the software, a monitor for the display of information receiving from the central processing unit and a keyboard connected to the central processing unit for manipulating information displayed on the monitor. The keyboard includes a keypad having a rectangular pattern of keys for a direct exchange of positions occupied by two partial pictures. The direct exchange is carried out by depressing any two keys of the keypad, thus, permitting the exchange of partial pictures not necessarily located within a common row or a common column, nor located at an end of a row or an end of a column. The exchange of partial pictures corresponds to the keys so depressed within a rectangular picture displayed on said monitor.

4 Claims, 11 Drawing Sheets

COMPUTER KEYBOARD FOR USE WITH SOFTWARE FOR PLAYING GAMES OR SOLVING PUZZLES

This application is a continuation of application Ser. No. 07/697,698, filed May 9, 1991, now abandoned.

FIELD OF THE INVENTION

The invention relates to a novel type of keyboard for use with P.C.-type computers or with equivalent ones, for home use. The keyboard can be used with a suitable software and is intended for playing a variety of games, and especially for the assembly of puzzles.

SUMMARY OF THE INVENTION

According to the invention there is provided a modified simple keyboard for use with P.C. and other types of computers, which keyboard is to be used in combination with suitable software, and which provides the possibility to use a P.C. computer for games, puzzle-type activity and also for educational purposes.

The novel simple keyboard can be used by persons of any age, but it is intended especially for children of small age (say up to about 10 years).

The keyboard is connected with a conventional P.C. type computer, preferably in a direct manner, but also possibly via the existing conventional keyboard.

The games are based on recognition of certain similarities of one picture with another, on the completion of certain series of sequences of numbers or other items, and on the rearrangement of parts of a picture which are presented in a "random" manner and which have to be rearranged to form a given picture or pattern.

The invention is illustrated with reference to the enclosed schematical drawings, which are of an illustrative nature only, and in which.

Figure 8:
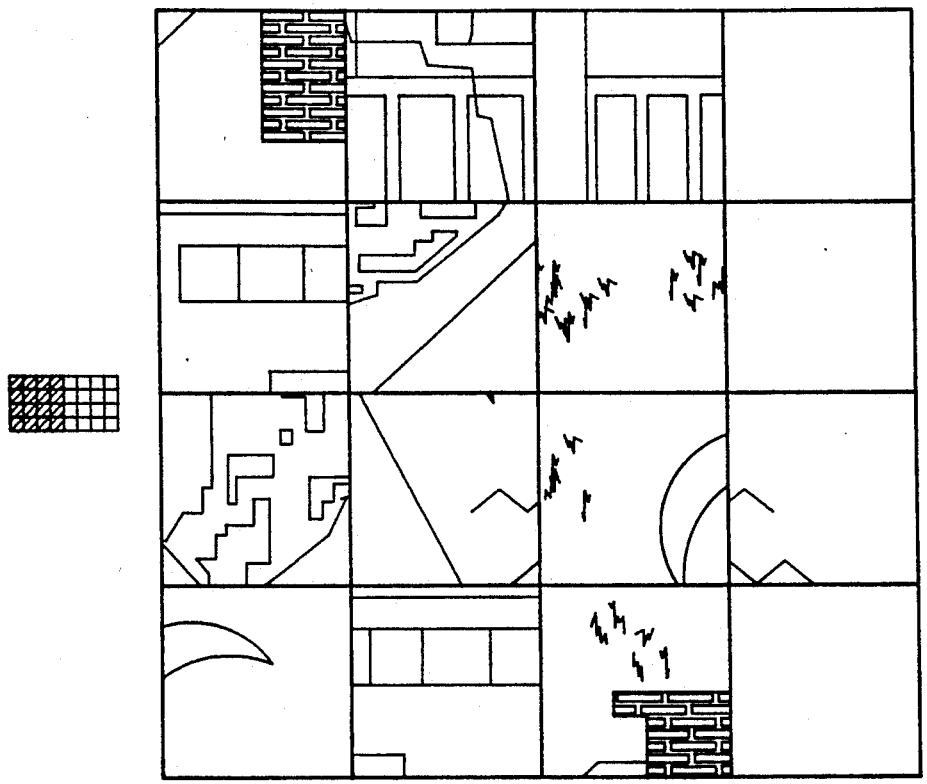
Figure 8A:
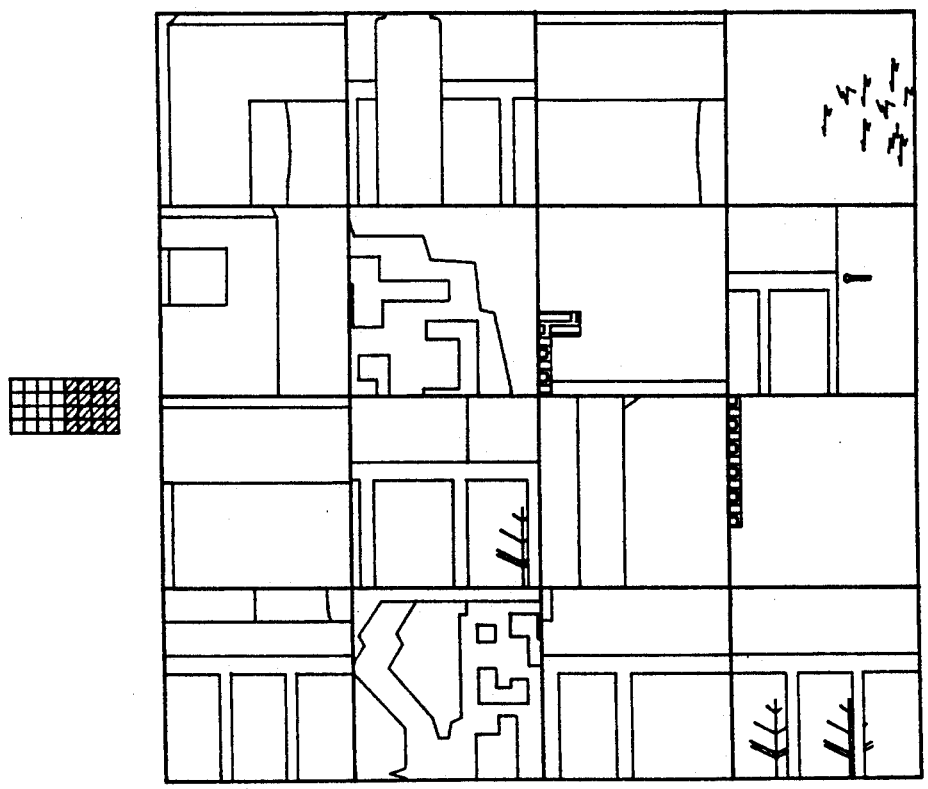
Figure 9:
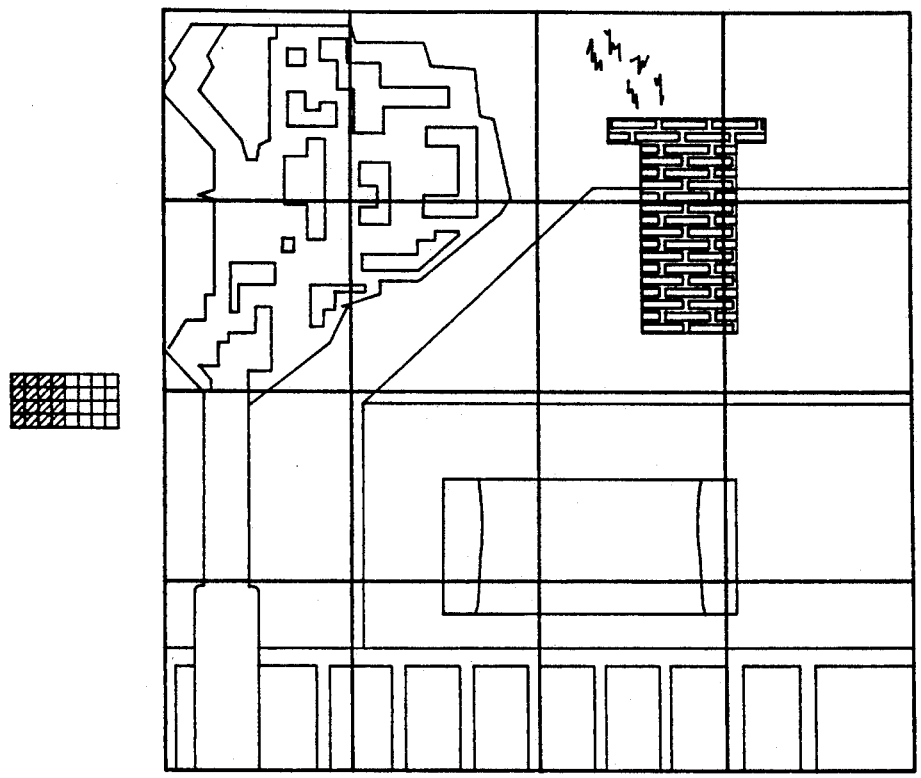
Figure 9A:
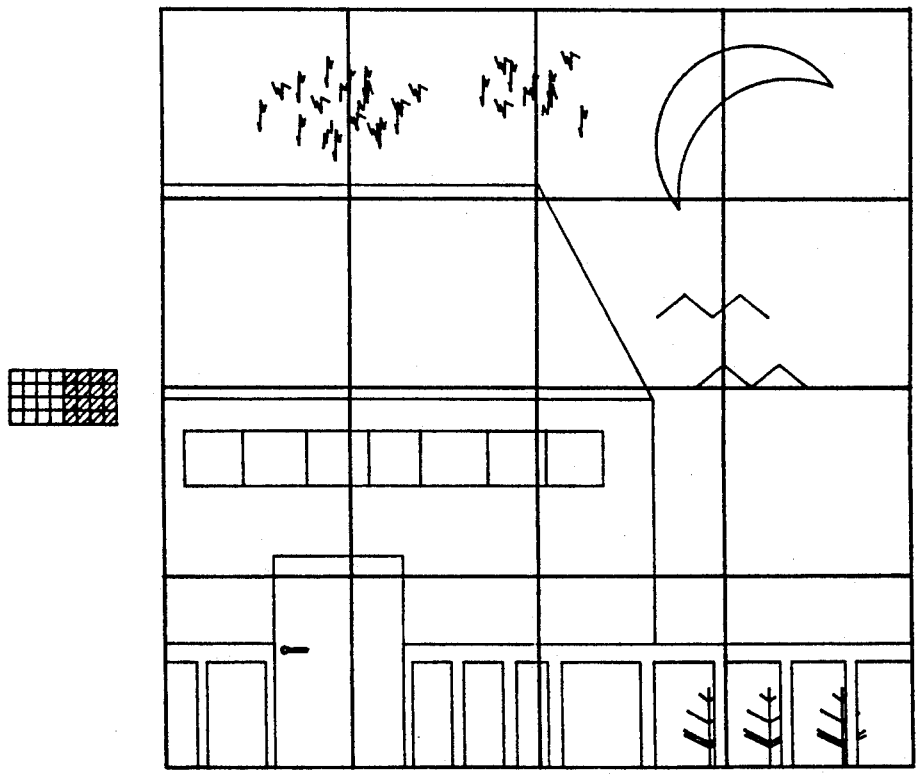

FIGS. 8 and 8a illustrate a picture pattern, in random arrangement, of 32 parts, which form a "puzzle", when arranged; and FIGS. 9 and 9a illustrate the two parts of the 32-part picture after rearrangement of the parts of FIGS. 8 and 8a.

Figure 10:
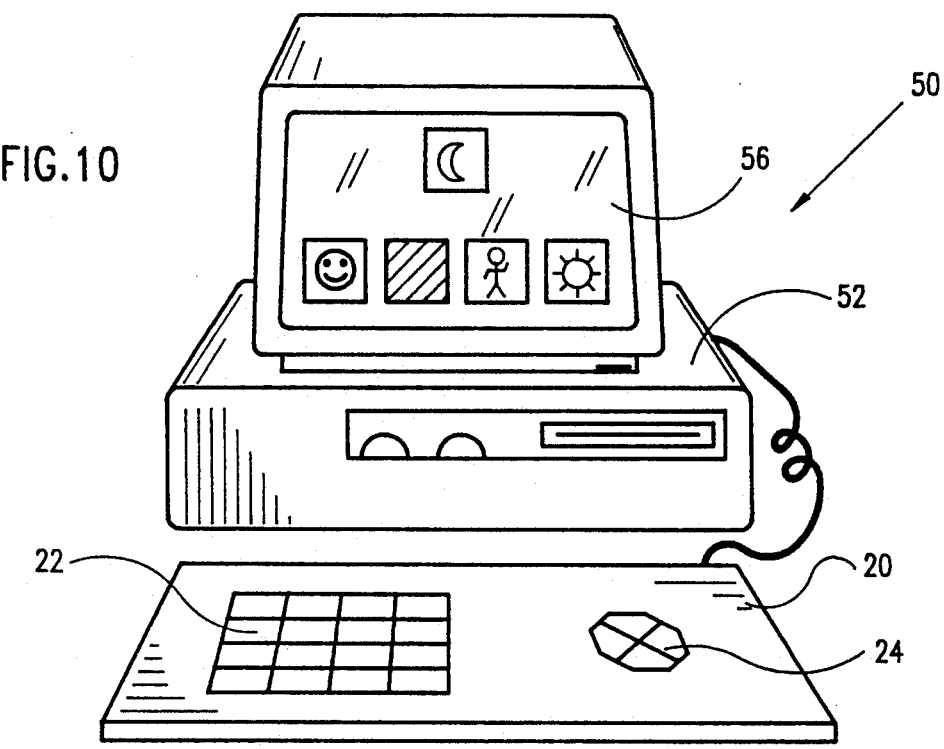

FIG. 10 illustrates the keyboard of the invention being connected to a personal computer, along with a monitor for displaying pictures of a puzzle, etc.

Figure 11:
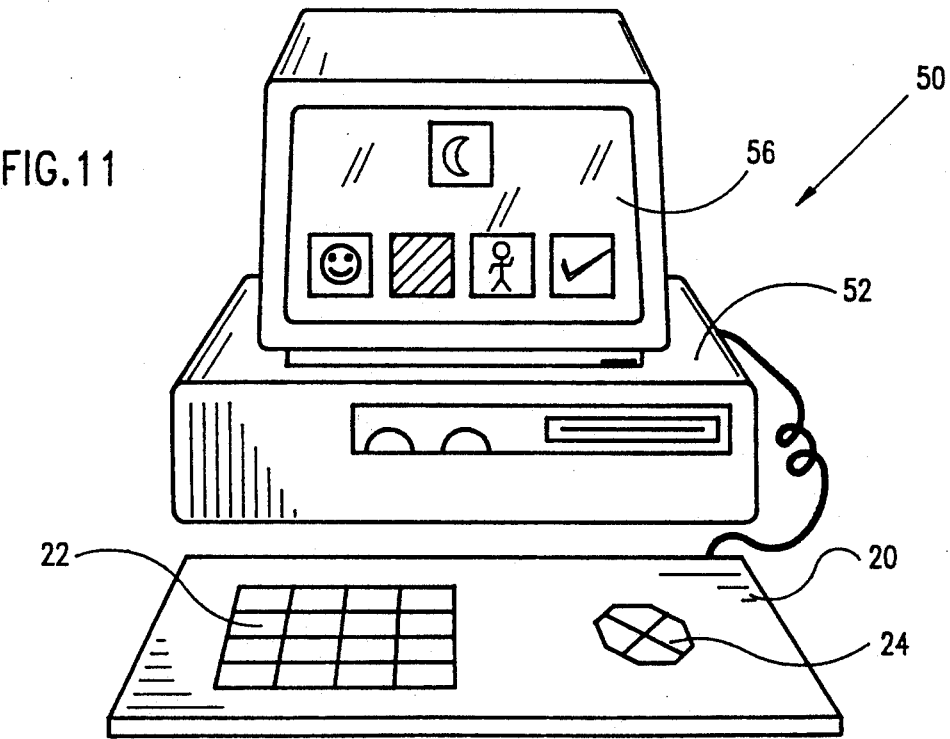

FIG. 11 illustrates the depression of a particular key corresponds to a particular, or correct, member of the puzzle of FIG. 10.

Figure 12:
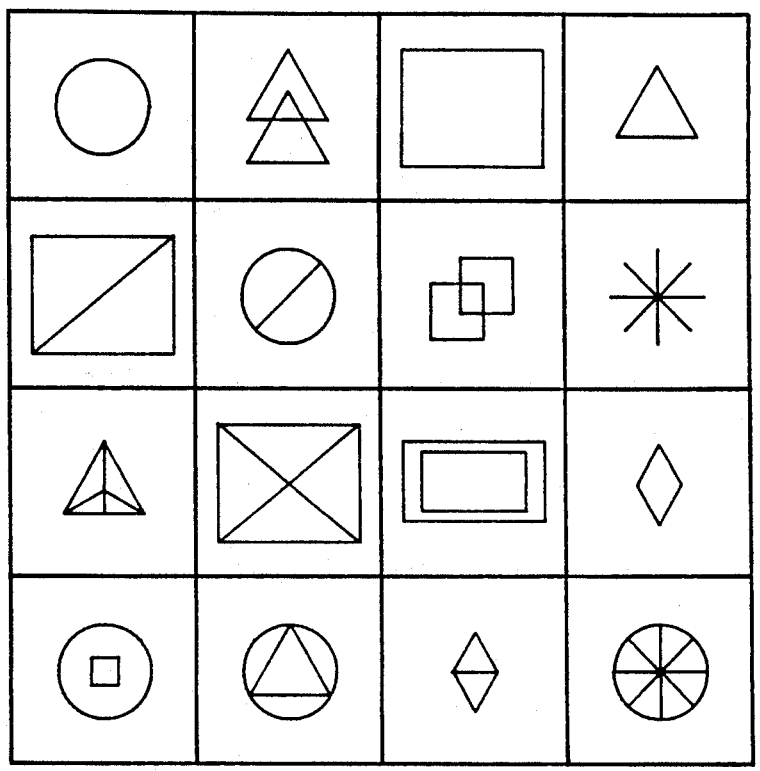
Figure 12A:
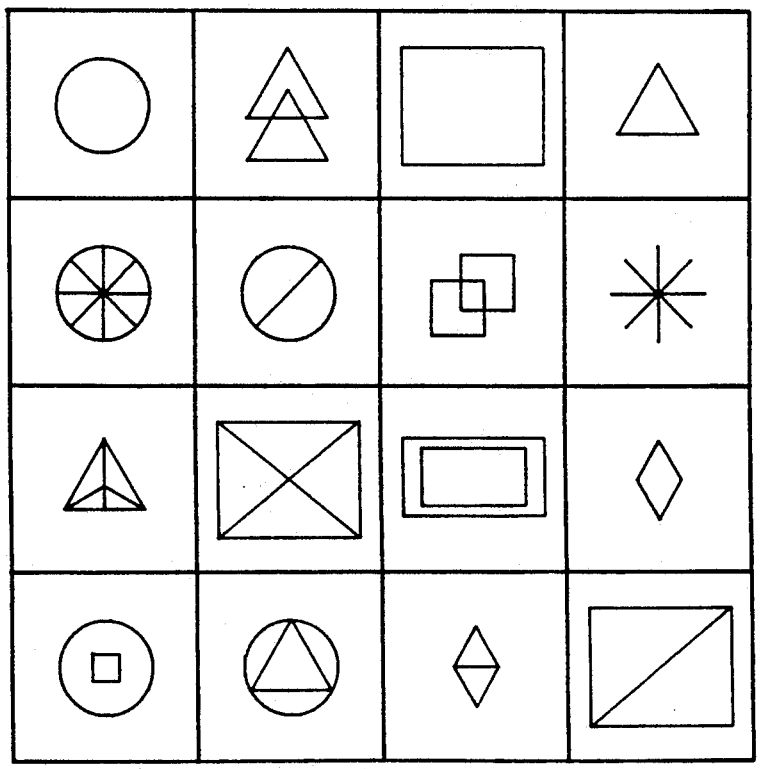
Figure 13A:
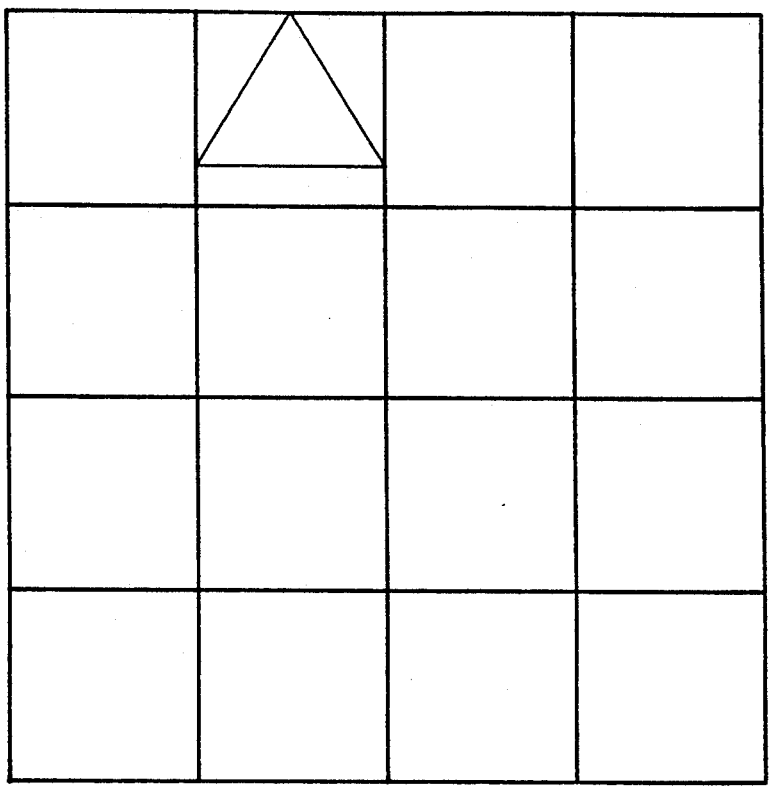
Figure 13B:
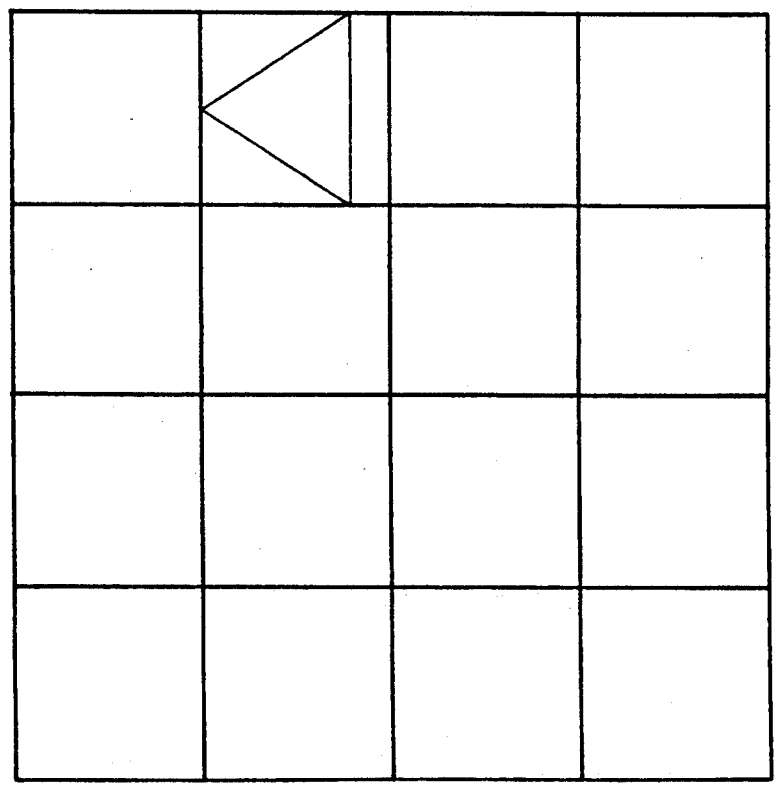
Figure 13C:
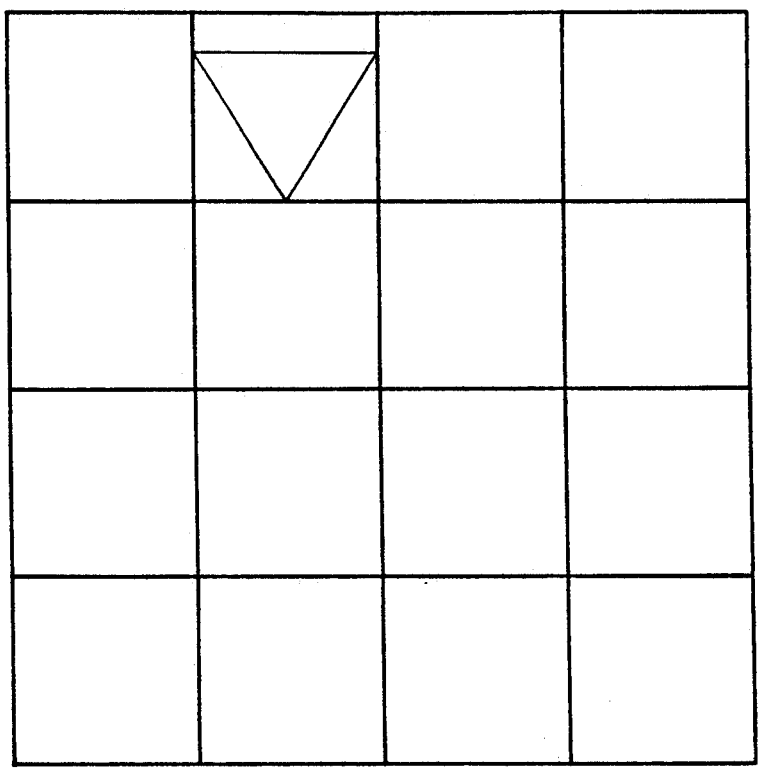
Figure 13D:
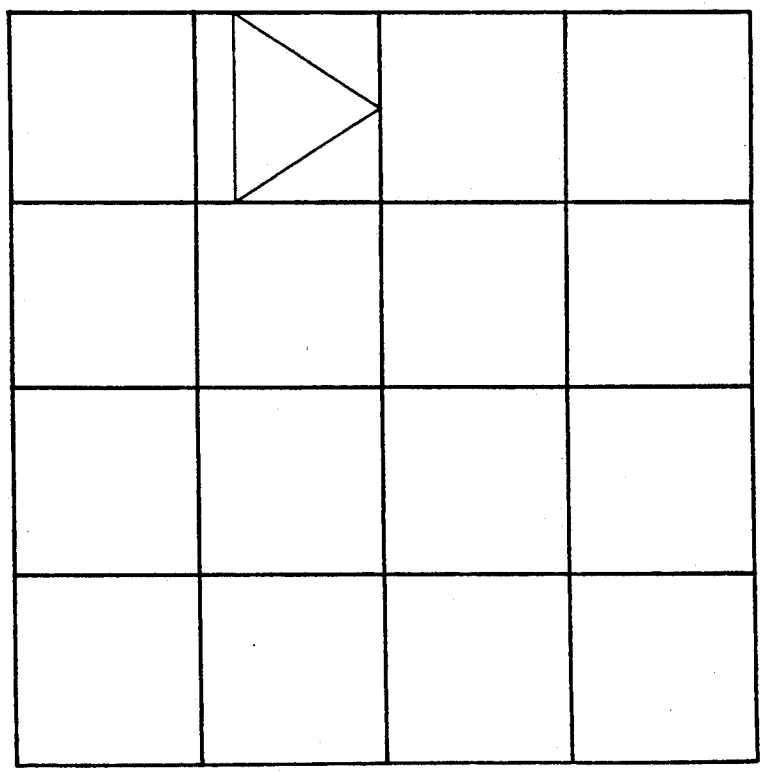

FIGS. 12 and 12a schematically illustrate the direct exchange of partial pictures within a 4×4 picture resulting from the depression of the two keys corresponding to said exchanged partial pictures.

FIGS. 13a, 13b, 13c and 13d illustrate the turning of a partial picture within a rectangular pattern by 90°.

Figure 14:
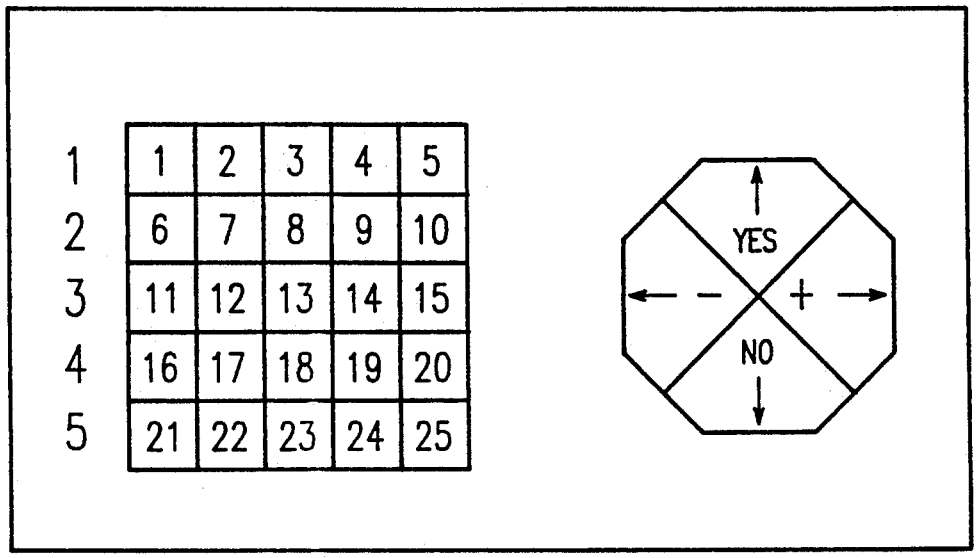
Figure 15:
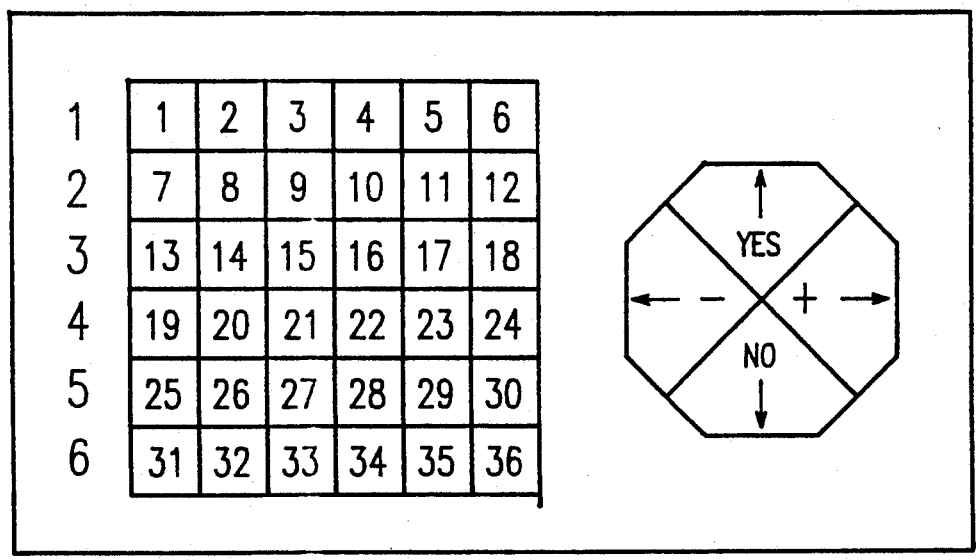

FIG. 14 is a top view of an alternative embodiment of the keyboard of the invention with the rectangular keypad having five rows and five columns; and, FIG. 15, is a top view of an additional, alternative embodiment of the keyboard of the invention with the rectangular keypad having six rows and six columns.

Figure 1:
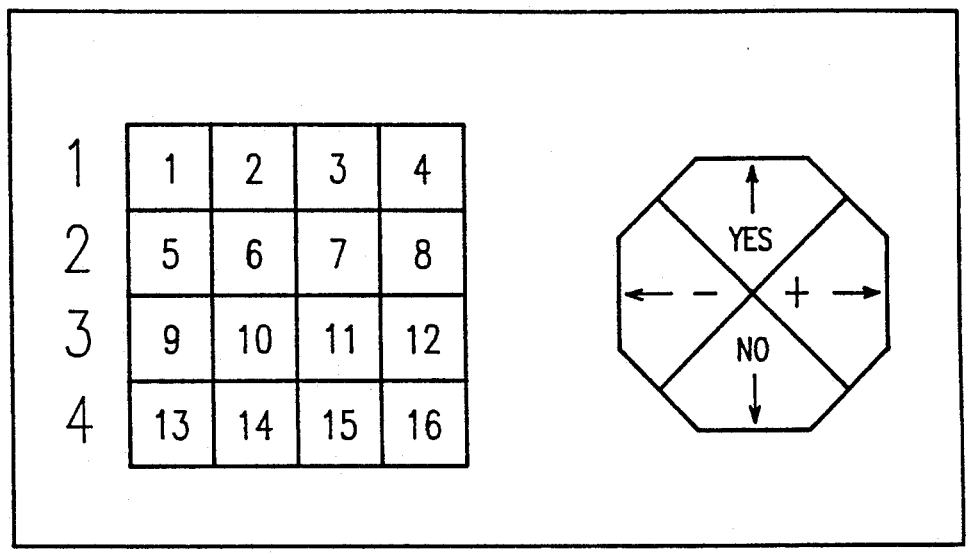
FIG. 1 is a top view of a keyboard of the invention.
Figure 2:
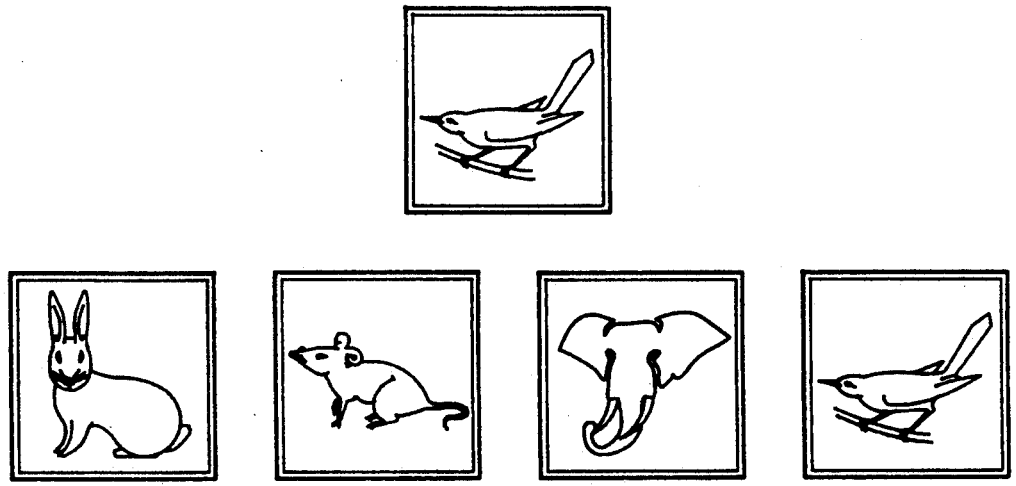
FIG. 2 illustrates a game of recognition of corresponding pictures.
Figure 3:
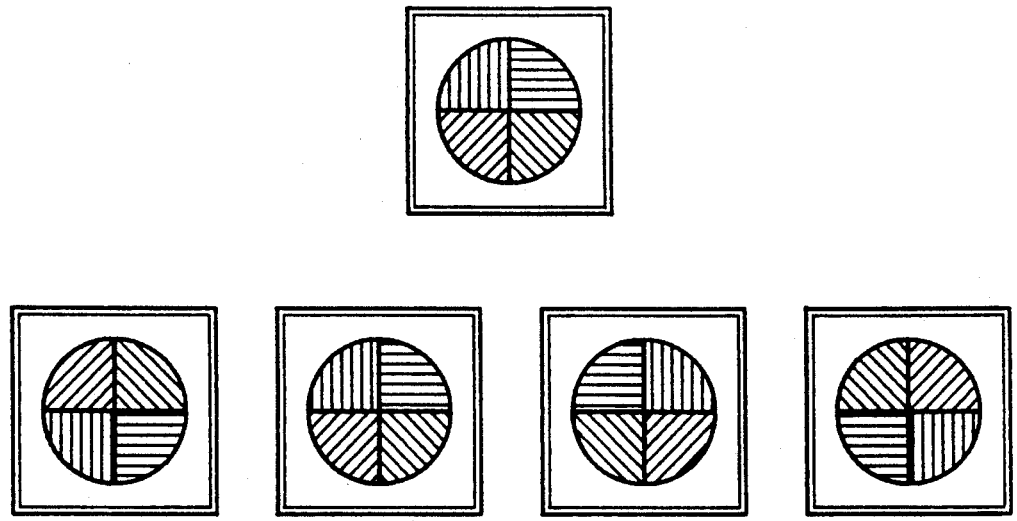
FIG. 3 illustrates a game of recognition of identical patterns.
Figure 4:
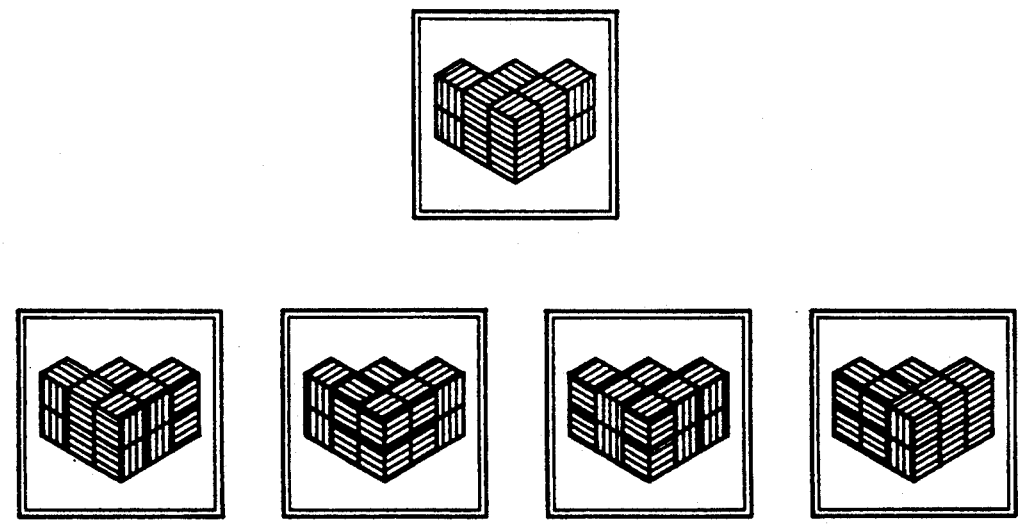
FIG. 4 illustrates a game of recognition of a more complex pattern.
Figure 5:
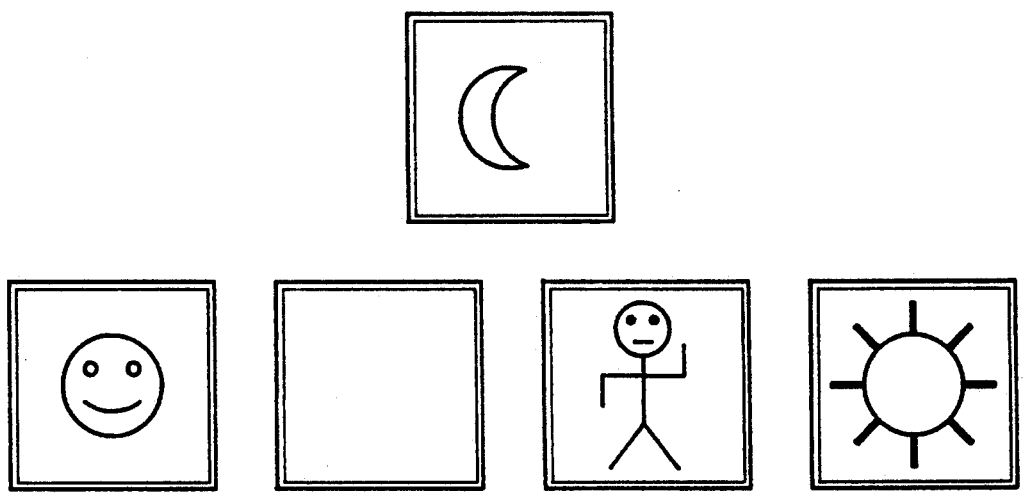
FIG. 5 illustrates a game of recognition of an analogy to a given picture.

As illustrated in FIG. 1, the novel keyboard 20 comprises a left-hand square 22 of 16 fields, with fields in a square of 4 such lines, which are designated by the numbers 1 to 16. On the right-hand side, there is shown an octagon 24 which is a keyboard with a number of functions marked thereon; The square 22 keyboard on the left, is used for two basic operations: when a picture such as FIG. 2 is displayed on the computer screen, the user has to press the key designated as "4 (of left-hand square 22)" indicating his recognition that the bird in the upper square is identical with that in the fourth square in the lower row;

This also applies to FIG. 3, where key No. 2 (of left-hand square 22) has to be pressed by the player; and, in an analogous manner to FIG. 4 where key No. 2 (of left-hand square 22) has to be pressed. When the pattern of FIG. 5 is displayed, the player has to recognize which of the pictures in the lower row has an analogy or connection with the picture in the upper square: here, it is key 4 (of left-hand square 22) which provides the analogy moon-sun.

Figure 6:
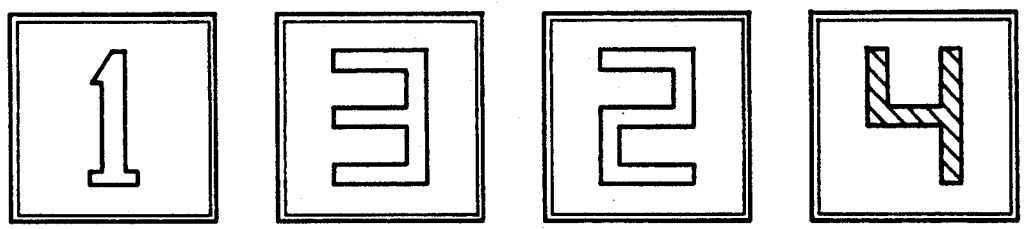
FIG. 6 illustrates a game based on the completion of a partial sequence.

The pattern of FIG. 6 is presented on the screen, and the user has to press the number "4" to complete the line of numbers.

Figure 7:
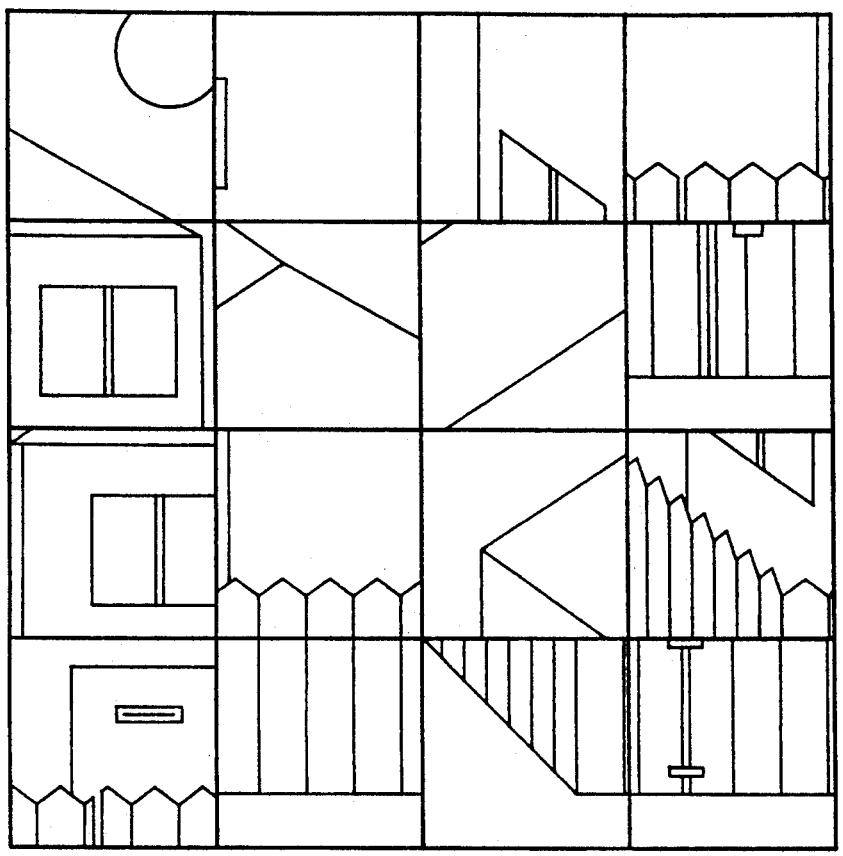
FIG. 7 illustrates a random arrangement of 16 parts of a picture.
Figure 7A:
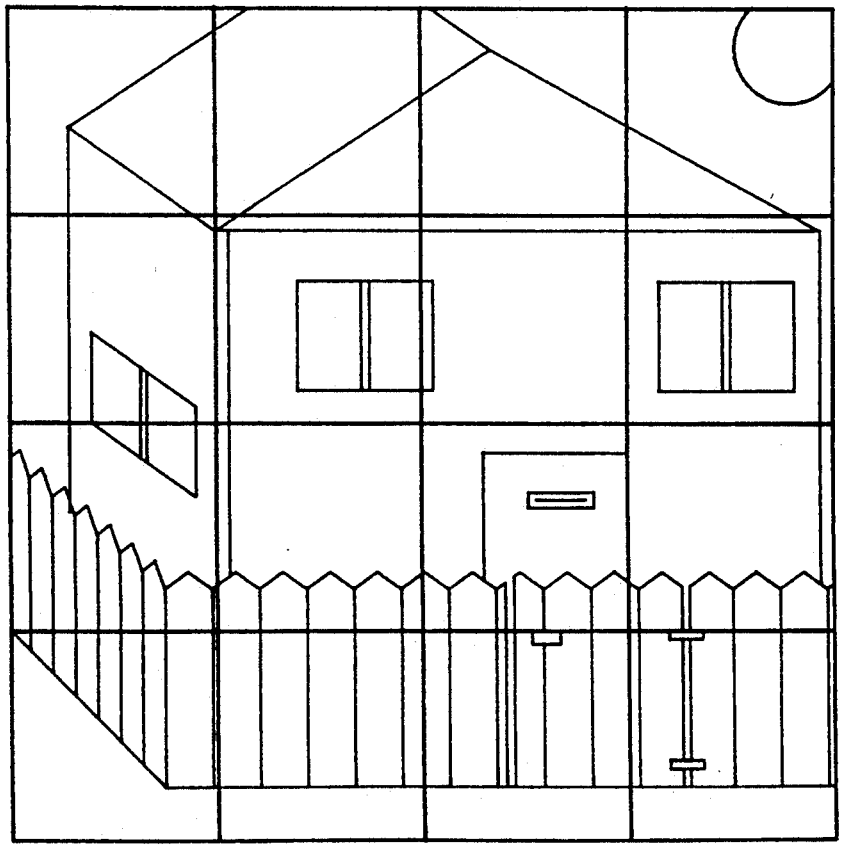
FIG. 7a illustrates the rearranged picture from the parts of FIG. 7.

The left-hand keyboard (22) is also used with a pattern of the type shown in FIGS. 7 (30) and 7a (32): The game may be played in two different versions:

Picture of FIG. 7a (32) is screened and disappears, and in its stead there is presented the pattern of 16 pictures of FIG. 7 (30). The user has to press two of the keys of the left-hand keypad square (22) (any two of keys 1 to 16), and this brings about an exchange of the picture displayed in a given square with that of the other one. For example, if the partial picture of square No. 1 is to be moved to square No. 4, the user presses sequentially or simultaneously keys and 4 of the left-hand keyboard square (22), and the two pictures change places. Thus it is possible, by a plurality of moves, to re-arrange the picture so as to result in the pattern of FIG. 7a (32). As stated, this can be done from memory, after initial presentation of FIG. 7a for a certain time, or when both patterns are presented on the screen. It is possible to count the number of moves for re-arrangement. When the same picture is again displayed as in FIG. 7 (30) the parts will be presented in a random manner but in a different arrangement. The pictures of FIGS. 9 and 9a, (38, 40) is one of 32 parts, which are presented in FIGS. 8 and 8a (34, 36) in a random, unarranged manner. On the computer screen, (56) there will be presented at any instant, only a square of 16 fields, and the rearrangement of parts is again done by pressing the two keys corresponding to the intended fields on the left-hand square keyboard (22). In order to make possible the exchange over the entire 32-part region, the keys with arrows pointing to the right and to the left can be used. A depression of the right-pointing arrow will move the displayed picture by one column to the right (thus displaying the 3 columns of the FIG. 8 pattern and the first column of the FIG. 8a pattern); while the actuation of the arrow pointing to the left will move the 16-field pattern to the left, thus making possible the exchanges extending over the entire 32-field picture.

Reference numeral 34a designates that the two pictures of FIGS. 8 and 8a are available for manipulation and that the picture of FIG. 8 is on computer screen (56) and available for manipulation. Reference numeral 36a indicates the same, except that the picture of FIG. 8a is on computer screen (56) and available for manipulation.

The right-hand key, also has keys (24) "YES" and "NO" which indicate at the end of each game whether the player wants to continue or not.

The arrows pointing upwards and downwards make it possible to play a game with a field of more than 4×4 fields, such as, for example 5×5, 6×6, or any other reasonable multiple and these arrows will move the displayed pattern up or down (always displaying only a part of the entire number of fields).

It is also possible to present the random arrangement of partial pictures with an arrangement where some point sideways, or that these are upside down. Actuation of a key "arrow to the right" or "arrow to the left" will, by each touch, turn such part of the picture by 90°, in the clockwise or anti-clockwise direction, respectively. The software is such that at the end of each action there is displayed a further pattern so that the player can continue. At the end of a game, the user can also move through the program by use of the + or − keys, moving from one game to the other.

FIG. 10 illustrates a computer system 50 for use with the inventive keyboard 20 with the keyboard of the invention being connected to a personal computer 52, along with a monitor 56 for displaying pictures of a puzzle, etc.

FIG. 11 illustrates the depression of a particular key, of left-hand square keypad 22, designated with the numeral "4," which corresponds to a particular, or correct, member of the puzzle of FIG. 10.

FIGS. 12 and 12a schematically illustrate the direct exchange of partial pictures within a 4×4 picture, which would appear on monitor 56, resulting from the depression of the two keys on left-hand keyboard pad 22 corresponding to said exchanged partial pictures.

FIGS. 13a, 13b, 13c and 13d illustrate the turning of a partial picture within a rectangular pattern by 90°, in a manner as heretofore described.

FIG. 14 is a top view of an alternative embodiment of the keyboard of the invention with the rectangular keypad having five rows and five columns; and, FIG. 15, is a top view of an additional, alternative embodiment of the keyboard of the invention with the rectangular keypad having six rows and six columns.

The alternative keyboards shown in FIGS. 14 and 15 would function in a manner analogous to that of the keyboard illustrated in FIG. 1.

It is clear that keyboards of this type make possible the use of home computers for a wide variety of games and educational purposes.

It is also clear that the exact nature of the keyboard, the various keys and their arrangement, are only given here as an example and that it is possible to use a wide variety of such keyboards of different arrangement and keys within the spirit of the present invention.

I claim:

1. A computer system having a computer keyboard for use with software for playing games or solving puzzles, comprising:

software for playing a puzzle game;

a central processing unit for processing said software;

a monitor for the display of information receiving from said central processing unit;

a keyboard connected to said central processing unit for manipulating information displayed on said monitor, said keyboard including:

a first keypad having a rectangular pattern of keys of "m" times "n" keys, wherein "m" and "n" are each an integer of from, and including, 4 to 8;

means for a direct exchange of positions occupied by two partial pictures, said means for a direct exchange including a depression of any two keys of said first keypad for permitting the direct exchange of partial pictures not located within a common row or a common column, nor located at an end of a row or an end of a column, corresponding to the keys so depressed, within a rectangular picture displayed on said monitor; and, a second keypad having keys for designating "yes" and "no" functions and for moving columns within the rectangular picture displayed on said monitor in either a leftward or rightward direction, said second keypad further including "+" and "−" keys for designating clockwise and counter-clockwise, respectively, whereby actuation of said "+" key results in a turn of a selected partial picture in a clockwise direction by 90° for each depression of said "+" key and actuation of said "−" key results in a turn of a selected partial picture in a counter-clockwise direction by 90° for each depression of said "−" key.

2. The computer system have the computer keyboard according to claim 1, wherein said first keypad of said keyboard has a rectangular pattern in which m=4 and n=4.

3. The computer system having the computer keyboard according to claim 1, wherein said first keypad of said keyboard has a rectangular pattern in which m=5 and n=5.

4. The computer system having the computer keyboard according to claim 1, wherein said first keypad of said keyboard has a rectangular pattern in which m=6 and n=6.

* * * * *